(12) United States Patent
Zhou

(10) Patent No.: US 11,561,650 B2
(45) Date of Patent: Jan. 24, 2023

(54) FUNCTION KEY MODULE OF GAME CONTROLLER AND GAME CONTROLLER

(71) Applicant: Shenzhen Zhixu Technology Co., Ltd., Shenzhen (CN)

(72) Inventor: Wei Zhou, Shenzhen (CN)

(73) Assignee: SHENZHEN ZHIXU TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/723,486

(22) Filed: Apr. 19, 2022

(65) Prior Publication Data
US 2022/0342504 A1    Oct. 27, 2022

(30) Foreign Application Priority Data
Apr. 22, 2021    (CN) .......................... 202110437034.7

(51) Int. Cl.
G06F 3/042    (2006.01)
A63F 13/24    (2014.01)
G06F 3/0354    (2013.01)

(52) U.S. Cl.
CPC ............ *G06F 3/0421* (2013.01); *A63F 13/24* (2014.09); *G06F 3/03547* (2013.01)

(58) Field of Classification Search
CPC .... G06F 3/03547; G06F 3/0362; G06F 3/042; G06F 3/0421; A63F 13/20; A63F 13/24; A63F 2300/1043; A63F 2300/1068
See application file for complete search history.

(56) References Cited

U.S. PATENT DOCUMENTS

| | | | | |
|---|---|---|---|---|
| 5,694,293 A | * | 12/1997 | Seto | G06F 1/1616 361/679.46 |
| 2002/0103025 A1 | * | 8/2002 | Murzanski | A63F 13/06 463/37 |
| 2010/0060578 A1 | * | 3/2010 | Chen | G06F 3/042 345/161 |
| 2014/0374908 A1 | * | 12/2014 | Koezuka | H01L 29/7869 438/653 |
| 2020/0120249 A1 | * | 4/2020 | Wang | H04N 5/2258 |
| 2021/0248984 A1 | * | 8/2021 | Tew | G10H 1/0066 |
| 2021/0252388 A1 | * | 8/2021 | VanWyk | A63F 13/214 |
| 2022/0152482 A1 | * | 5/2022 | Box | A63F 13/24 |

* cited by examiner

*Primary Examiner* — Joe H Cheng

(57) ABSTRACT

A function key module of a game controller and a game controller are provided. The function key module includes a key housing, a lens component, a hollow packaging board, a circuit board, a flat cable, and a bottom casing. The flat cable is fixedly connected to the bottom casing. The circuit board is electrically connected to the flat cable, and the hollow packaging board is arranged above the circuit board. The lens component is arranged above the hollow packaging board. The key housing is fixedly connected to the bottom casing. The circuit board is provided with an OFN module, an infrared LED light source module, and a photosensitive array module. The OFN module, the infrared LED light source module, and the photosensitive array module are electrically connected to each other.

7 Claims, 4 Drawing Sheets

FUNCTION KEY MODULE OF GAME CONTROLLER AND GAME CONTROLLER

CROSS REFERENCE TO RELATED APPLICATION

The present disclosure claims priority to Chinese Patent Application No. 202110437034.7, filed Apr. 22, 2021, which is hereby incorporated by reference herein as if set forth in its entirety.

BACKGROUND

1. Technical Field

The present disclosure relates to the field of controller technologies, and particular to a function key module of a game controller and the game controller.

2. Description of Related Art

In recent years, mobile games have rapidly developed. The use of touch screens in the mobile games has certain limitations, which is different from the conventional game consoles in operation, so that the requirement of using a game controller to control the mobile games has emerged. However, the key design of the conventional controller conflicts with the flexibility of touch screen operation. The controller in the market has the advantages that the touch screen does not have due to the physical feedback of the keys, but has inherent defects in the flexibility of touch screen operation. In order to solve the problem, some manufacturers use a key and a mechanical wheel to simulate the directional operation requirements of the touch screen. However, this method has a complex structure, such that the controller housing needs to be redesigned to have a complex structure. In addition, the hand feeling (pressure sensitivity and key distance) of the conventional key of the controller is affected due to differences in structure, and other problems such as cost, usage habits, product quality, stability, etc. are further caused.

BRIEF DESCRIPTION OF THE DRAWINGS

In order to more clearly illustrate the technical solutions in this embodiment disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objectives, technical solutions, and advantages of the present disclosure clearer, the present disclosure will be further described in detail below with reference to the drawings and embodiments. It should be understood that, the embodiments described herein are only for explaining the present disclosure and are not intended to limit the present disclosure.

Figure 1:
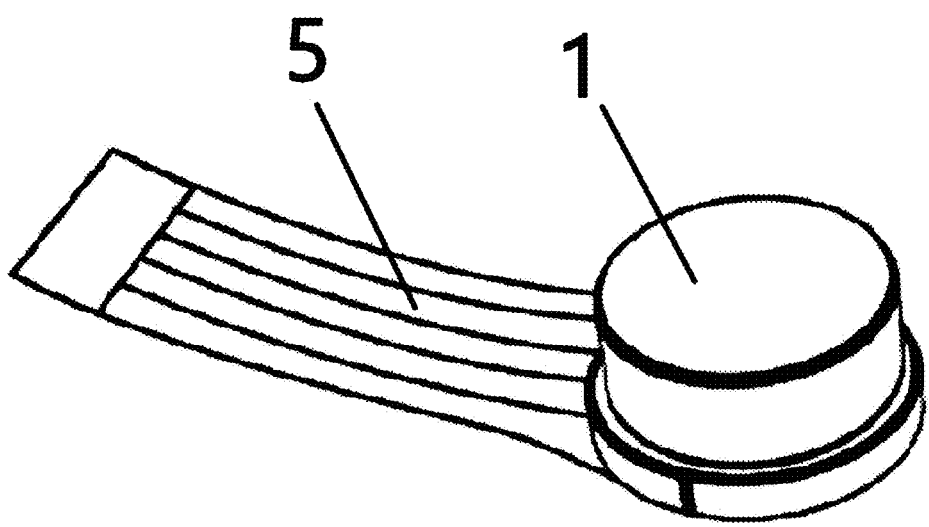
FIG. 1 is a perspective view of a function key module of a game controller according to the present disclosure.
Figure 2:
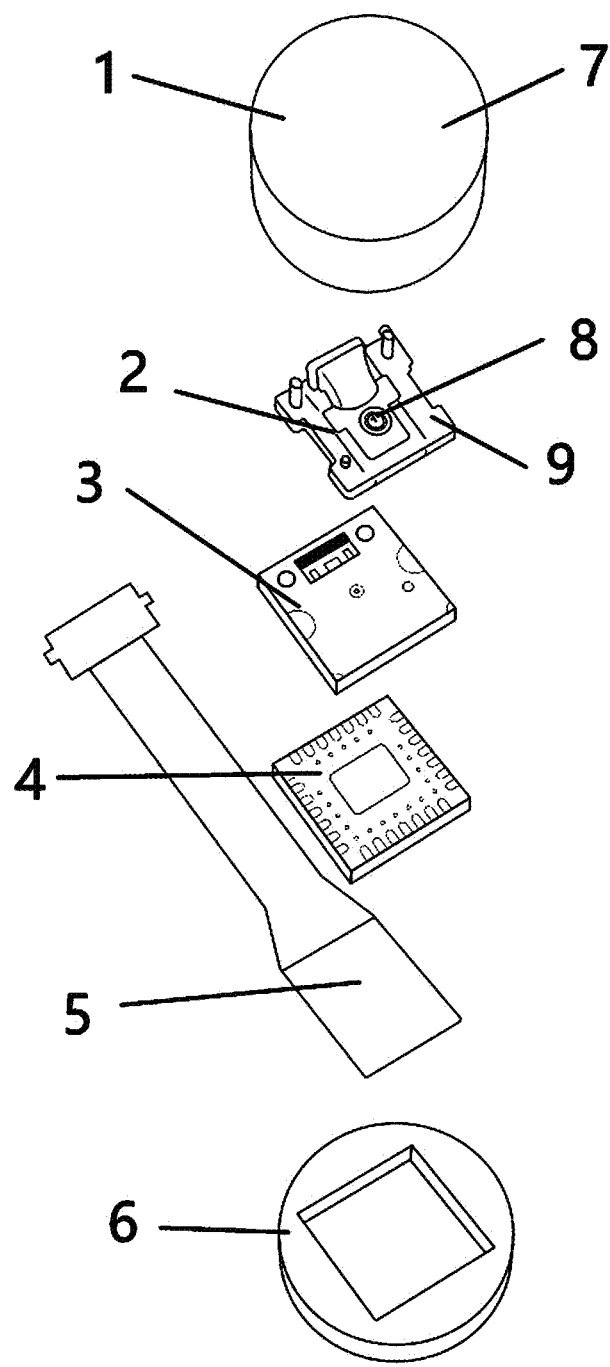
FIG. 2 is an exploded view of a function key module of a game controller according to the present disclosure.
Figure 3:
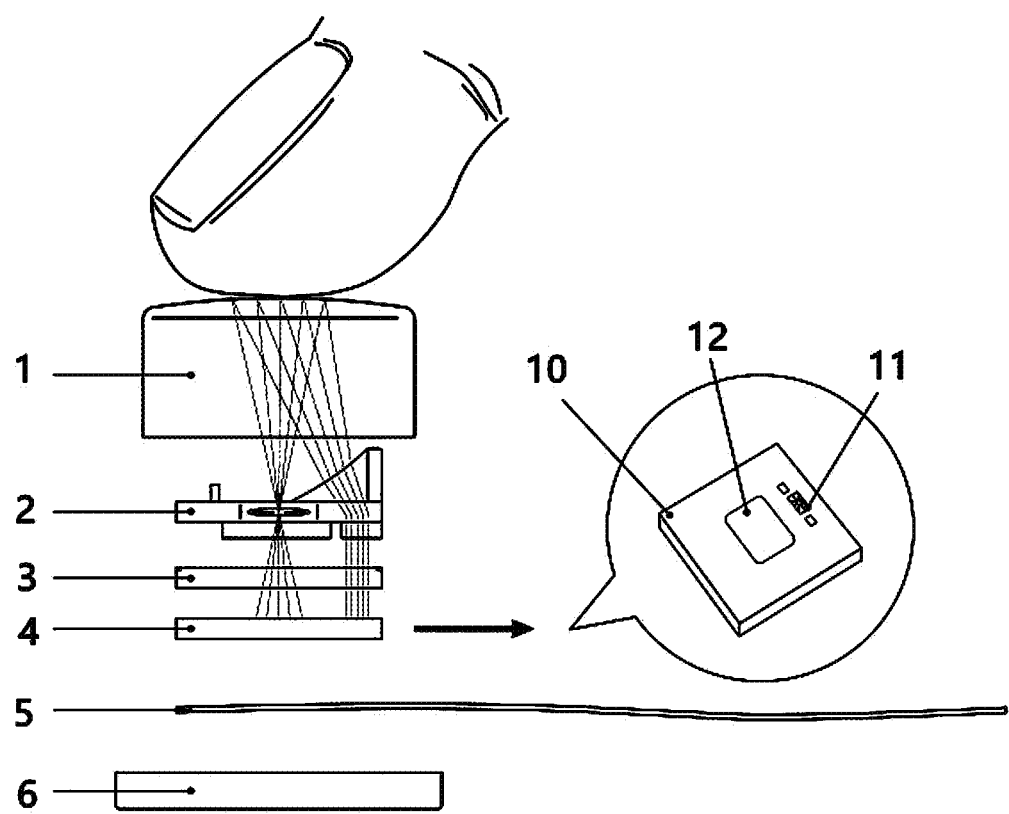
FIG. 3 is an exploded view of a function key module of a game controller according to the present disclosure from another perspective.

Referring to FIG. 1 to FIG. 3, embodiments of the present disclosure provide a function key module of a game controller, which includes a key housing 1, a lens component 2, a hollow packaging board 3, a circuit board 4, a flat cable 5, and a bottom casing 6. The flat cable 5 is fixedly connected to the bottom casing 6. The circuit board 4 is electrically connected to the flat cable 5, and the hollow packaging board 3 is arranged above the circuit board 4. The lens component 2 is arranged above the hollow packaging board 3. The key housing 1 is fixedly connected to the bottom casing 6. The circuit board 4 is provided with an optical finger navigation (OFN) module 10, an infrared light-emitting diode (LED) light source module 11, and a photosensitive array module 12. The OFN module 10, the infrared LED light source module 11, and the photosensitive array module 12 are electrically connected to each other. The key housing 1 is provided with a light-shielding touch panel 7, and the light-shielding touch panel 7 is arranged on a surface of the key housing 1. The lens component 2 is provided with a fixing plate 9 and an optical lens module 8, and the optical lens module 8 is fixedly mounted on the fixing plate 9. The OFN module 10 is an optical finger navigation that generates navigation signals in response to movement detected at a navigation surface based on light reflected from a user's finger.

In the present embodiment, the optical finger navigation OFN module 10 generally includes an infrared LED light source module 11, a light-shielding touch panel 7, an optical lens module 8, and an on-chip processing/control chip with a photosensitive array module 12, and is generally fabricated on a flexible circuit flexible printing circuit (FPC) board that is convenient for integrated application. The commonly used OFNFPC also integrates surface keys, so-called "Metal Dome Switch", to simply achieve the "click confirmation" function. The OFN module 10 operates according to the following principle: when a finger is in contact with the light-shielding touch panel 7, the photosensitive array module 10 detects a target activity, the system-on-chip (SoC) is waken up to be in a normal operation state, the infrared LED light source module 11 emits light, a detection light path is started, and image data information is obtained by the photosensitive array module 12 screen by screen through refraction and focusing of the optical lens module 8. The SoC abstracts different motion vectors (MVs) from the image data information, and then calculates the relative plane quantity of each finger movement according to the correlation of the motion vectors in time and space to form motion data, and the motion data is transmitted outside through a data interface in time. After the finger is removed, the photosensitive array module 12 can also make the SoC switch to a sleep state through detection, so as to save power consumption. The light-shielding touch panel 7 needs to be able to cope with strong light radiation interference and external humidity change. The determination and calculation of motion correlation is the core of OFN, and the simplified 13-point, 9-point, 7-point, or 5-point motion prediction algorithm developed in an optical mouse is generally used. The obtained series of data can also be further analyzed and calculated to obtain accompanying information such as "clicking", "double clicking", "dragging", and the like, so that various functions of the conventional mouse are realized. The OFN forms data information generally including two types: control information and motion information. The control information indicates whether to move, click, double click, drag, etc., and the motion information is the relative displacement between the X and Y directions of the plane.

Figure 4:
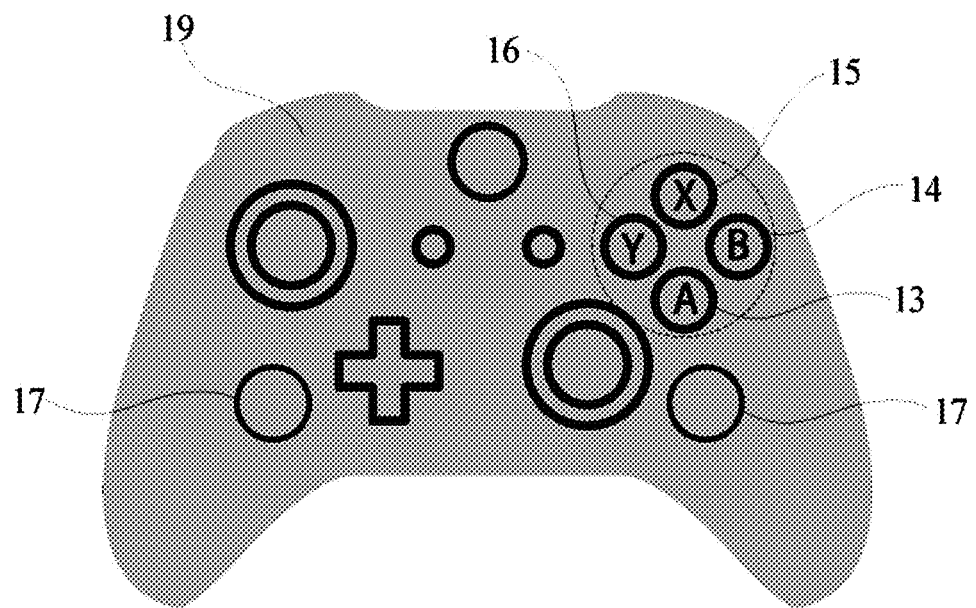
FIG. 4 is a schematic view of a game controller according to the present disclosure.

Referring to FIG. 4, an embodiment of the present disclosure further provides a game controller 19, which includes the function key module provided in any of the above embodiments.

Specifically, the game controller 19 is provided with an A function key 13, a B function key 14, an X function key 15, and a Y function key 16. The A function key 13, the B function key 14, the X function key 15, or the Y function key 16 is provided with the function key module.

It should be noted that the A function key 13, the B function key 14, the X function key 15, and the Y function key 16 represent identifiers of function keys of a game controller. Depending on different platforms corresponding to the controller, the names of the keys are different or replaced by other graphic symbols, no matter what kind of function keys, the use of the present disclosure to realize the direction control of the key is all within the protection scope of this application.

Furthermore, the game controller 19 is also provided with an optical navigation joystick 17, and the function key module is arranged in the optical navigation joystick 17. No matter the shape of the optical navigation joystick 17, such as a circle or a square, and no matter the number thereof and the location of the optical navigation joystick 17 on the game controller is used, for example, one optical navigation joystick 17 on the right side of the controller to achieve precise control of the function of the right joystick, or two optical navigation joysticks 17 to achieve the functions of assisting or replacing the left joystick and the right joystick simultaneously, are all fall within the protection scope of the present disclosure.

The function key module of the game controller provided by the present disclosure adopts the function key module of the game controller with the optical finger navigation function, which can solve the technical problem very well. By adding direction control to the function keys of the game controller, the function key module of the game controller with the optical finger navigation function is highly integrated in performance, low in cost, and small in size, which is very popular due to the upgrade in the structure of the conventional game controller. The game controller can be seamlessly integrated into various conventional game controller application software and hardware systems and expanded into a new game controller product, as long as the development rules of various mobile game software systems and the driving software under an operating platform are followed according to the specific characteristics of the functional components of the game controller, and the specific conditions are specifically analyzed according to local conditions. The optical finger navigation module has excellent application prospect, and promotes the deep revolution and the long-term development of the human-machine input interface of the function keys of the game controller.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A function key module of a game controller, comprising a key housing, a lens component, a hollow packaging board, a circuit board, a flat cable, and a bottom casing;
    the flat cable being fixedly connected to the bottom casing, the circuit board being electrically connected to the flat cable, the hollow packaging board being arranged above the circuit board, the lens component being arranged above the hollow packaging board, and the key housing being fixedly connected to the bottom casing;
    the circuit board being provided with an optical finger navigation (OFN) module, an infrared light-emitting diode (LED) light source module, and a photosensitive array module; the OFN module, the infrared LED light source module, and the photosensitive array module being electrically connected to each other.

2. The function key module of the game controller according to claim 1, wherein the key housing is provided with a light-shielding touch panel, and the light-shielding touch panel is arranged on a surface of the key housing.

3. The function key module of the game controller according to claim 1, wherein the lens component is provided with a fixing plate and an optical lens module, and the optical lens module is fixedly mounted on the fixing plate.

4. The function key module of the game controller according to claim 1, wherein the OFN module is an optical finger navigation that generates a navigation signal in response to a movement detected at a navigation surface based on light reflected from a finger of a user.

5. A game controller, comprising the function key module according to claim 1.

6. The game controller according to claim 5, wherein the game controller is provided with an A function key, a B function key, an X function key, and a Y function key; the A function key, the B function key, the X function key, or the Y function key is provided with the function key module.

7. The game controller according to claim 5, wherein the game controller is further provided with an optical navigation joystick, and the function key module is provided in the optical navigation joystick.

* * * * *